(12) United States Patent
Werner et al.

(10) Patent No.: US 9,710,746 B2
(45) Date of Patent: Jul. 18, 2017

(54) RADIO FREQUENCY IDENTIFICATION ANTENNA APPARATUS

(71) Applicant: The Penn State Research Foundation, University Park, PA (US)

(72) Inventors: Douglas H. Werner, State College, PA (US); Zhihao Jiang, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 15/155,442

(22) Filed: May 16, 2016

(65) Prior Publication Data

US 2016/0350642 A1    Dec. 1, 2016

Related U.S. Application Data

(60) Provisional application No. 62/169,248, filed on Jun. 1, 2015.

(51) Int. Cl.
| | |
|---|---|
| *G06K 19/06* | (2006.01) |
| *G06K 19/077* | (2006.01) |
| *G06K 7/10* | (2006.01) |

(52) U.S. Cl.
CPC ... *G06K 19/07788* (2013.01); *G06K 7/10326* (2013.01); *G06K 7/10366* (2013.01)

(58) Field of Classification Search
CPC ......... G06K 19/07788; G06K 7/10326; G06K 7/10366; G06K 19/07749; G06K 19/07773; H01Q 9/0407; H01Q 1/2208; H01Q 9/0421; H01Q 13/10; H01Q 13/18; H01Q 19/005; H01Q 1/2283

USPC ........................................................ 235/492
See application file for complete search history.

(56) References Cited

U.S. PATENT DOCUMENTS

| | | | |
|---|---|---|---|
| 5,448,250 | A | 9/1995 | Day |
| 6,028,561 | A | 2/2000 | Takei |
| 6,188,369 | B1 | 2/2001 | Okabe et al. |
| 7,126,549 | B2 | 10/2006 | Li et al. |
| 7,586,415 | B2 | 9/2009 | Lee |

(Continued)

FOREIGN PATENT DOCUMENTS

WO    2009082300 A1    7/2009

OTHER PUBLICATIONS

International Search Report for PCT/US2016/032812 dated Sep. 15, 2016.

(Continued)

*Primary Examiner* — Claude J Brown
(74) *Attorney, Agent, or Firm* — Buchanan Ingersoll & Rooney PC (57) ABSTRACT

Embodiments of an RFID tag antenna apparatus can include a ground plane, a first patch, and a second patch. The first and second patches can be positioned to define a radiating slot that is located between the first and second patches. The radiating slot can be configured to receive an RFID chip for attachment of the RFID chip to the antenna apparatus such that the chip is positioned in the slot between the first and second patches and the ground plane. Embodiments of the RFID tag apparatus may be included in a communication system that utilizes one or more RFID antenna apparatuses and/or a RFID device utilizing one or more RFID antenna apparatuses.

20 Claims, 9 Drawing Sheets

(56) References Cited

U.S. PATENT DOCUMENTS

| | | | |
|---|---|---|---|
| 8,253,640 B2 | 8/2012 | Kitayoshi et al. | |
| 8,674,810 B2 | 3/2014 | Uysal et al. | |
| 8,717,238 B2 | 5/2014 | Fogg et al. | |
| 2007/0152885 A1* | 7/2007 | Sorvala | H01Q 1/2283 343/700 MS |
| 2007/0164868 A1* | 7/2007 | Deavours | G06K 19/07749 340/572.7 |
| 2008/0204347 A1* | 8/2008 | Alvey | H01Q 1/52 343/841 |
| 2008/0284656 A1 | 11/2008 | Petropoulos | |
| 2010/0007561 A1* | 1/2010 | Bucca | H01Q 9/0407 343/700 MS |
| 2010/0066636 A1* | 3/2010 | Carr | H01Q 1/38 343/904 |
| 2011/0221644 A1* | 9/2011 | Lee | H01Q 9/0421 343/770 |
| 2011/0270525 A1* | 11/2011 | Hunter | E21B 44/00 702/6 |
| 2011/0273360 A1 | 11/2011 | Campero et al. | |
| 2012/0187198 A1* | 7/2012 | Kato | G06K 19/07771 235/492 |
| 2013/0234829 A1 | 9/2013 | Jeon et al. | |
| 2013/0313328 A1 | 11/2013 | Mohajer-Iravani et al. | |
| 2014/0217175 A1 | 8/2014 | Fogg et al. | |

OTHER PUBLICATIONS

Written Opinion of the International Searching Authority for PCT/US2016/032812 dated Sep. 15, 2016.

"Miniaturization of Robust UHF RFID Antennas for Use on Perishable Goods and Human Bodies," A. Dubok and A.B. Smolders, IEEE Antennas and Wireless Propagation Letters, vol. 13, 2014.

"On-Body Performance of a Wearable Single-Layer RFID Tag," Tiiti Kellomaki; IEEE Antennas and Wireless Propagation Letters, vol. 11, 2012.

"RFID Antennas for the UHF Remote Monitoring of Human Subjects," Gaetano Marrocco; IEEE Transactions on Antennas and Propagation, vol. 55, No. 6, Jun. 2007.

"UHF RF Identification of People in Indoor and Open Areas," M. Polivka, M. Svanda, P. Hudec, S. Zvanovec; IEEE Transactions on Microwave Theory and Techniques, vol. 57, No. 5, May 2009.

* cited by examiner

RADIO FREQUENCY IDENTIFICATION ANTENNA APPARATUS

CROSS-REFERENCE TO RELATED APPLICATIONS

This application claims priority to U.S. Provisional Patent Application No. 62/169,248, which was filed on Jun. 1, 2015.

STATEMENT REGARDING FEDERALLY SPONSORED RESEARCH

This invention was made with government support under Grant No. EEC1160483, awarded by the National Science Foundation. The Government has certain rights in the invention.

FIELD OF INVENTION

The present innovation relates to antennas, such as, for example, antenna apparatuses that may be included or attached to radio frequency identification devices.

BACKGROUND OF THE INVENTION

Radio frequency identification (RFID) is a methodology that can be employed for tracking of goods in supply chains. Some RFID systems are configured as a passive system. Others may be configured as an active system. Passive RFID systems are preferred for a number of applications because such systems tend to have a lower cost as compared to active RFID systems. For passive RFID systems, a RFID tag that is to be read by a reader often has an antenna that has a small electrical size. Single resonance RFID antennas have a resonance near the center of the operating band. In particular, this operating band is either the 868 MHz band, or the 915 MHz band, or both of these bands. For many RFID tag antenna designs, this small size and frequency range is desired due to design criteria that requires the tag antenna's input impedance to be a conjugate match to that of the chip to which it is connected, and the chip typically has a small resistance and a moderate capacitive reactance.

Such impedance matching can be a difficult design problem for an RFID tag antenna that is to be used in a system in which the RFID tag may be worn by, attached to, or on a human body or other animal body. The difficulty with such impedance matching can contribute to a small read range for readers of such RFID tags that may be worn by, attached to, or on an animal (e.g. a human, a dog, a farm animal, etc.).

SUMMARY OF THE INVENTION

An RFID antenna apparatus, communication system that utilizes one or more RFID antenna apparatuses, and a RFID device utilizing one or more RFID antenna apparatuses are provided. Embodiments of the RFID tag antenna apparatus can include a ground plane, a first patch, and a second patch. The first and second patches can be positioned to define a radiating slot that is located between the first and second patches. In some embodiments, metal sidewalls may extend from opposite sides of the ground plane. A first metal sidewall may extend from the ground plane to adjacent an outer perimeter edge of the first patch and a second sidewall may extend from the ground plane to adjacent an outer perimeter edge of the second patch. The radiating slot can be defined between an inner edge of the first patch and an inner edge of the second path. The inner edge of the first patch can be opposite the outer perimeter edge of the first patch and the inner edge of the second patch can be opposite the outer perimeter edge of the second patch. The defined radiating slot can be configured to receive an RFID chip for connection to the antenna apparatus so that the antenna apparatus is able to transmit data from at least one device to the RFID chip and transmit data from the RFID chip to at least one device. For instance, the RFID chip can be positioned in the radiating slot between the first and second patches and the ground plane and be electrically connected to the first patch and/or the second patch and/or the ground plane for receiving data and transmitting data via the antenna apparatus.

Embodiments of communication systems can include at least one RFID reader device that may transmit data to the RFID chip via an antenna apparatus connected to that chip and/or receive data from the RFID chip via the antenna apparatus connected to that chip. Each RFID reader may be communicatively connected to at least one computer device having at least one transceiver unit, non-transitory memory and at least one processor connected to that memory and/or the transceiver unit. The computer device may be configured to receive data from the RFID chip via the RFID reader and utilize that data via at least one application stored in its memory that is run by its processor. The communication system may be configured as a network in some embodiments. The network may also include other network elements such as network nodes (e.g. other computer devices, switch devices, border control elements, gateways, etc.).

An RFID device can include a chip connected to the RFID antenna apparatus. In some embodiments, the RFID device may be configured as an RFID tag. The RFID device may have a body that is loading the RFID antenna that is configured to be worn by an animal such as a human, a dog, a farm animal, or other type of animal. The body may be, for example, a band, an annular structure, a bracelet, a clip-on badge, a headband, an arm band, a wrist band, a ring, a type of wearable garment, or other type of body that is wearable by a human or other type of animal.

In some embodiments, an antenna apparatus is provided that includes a ground plane, a first patch spaced apart from the ground plane, and a second patch spaced apart from the ground plan. The first and second patches can be spaced apart from each other to define a slot between the first and second patches that is spaced apart from the ground plane.

In some embodiments, the slot is open ended. For instance, the slot may be configured to space an entirety of the first patch from the entirety of the second patch.

The first and second patches and the ground plane can define a chamber therebetween. A dielectric substrate can be positioned in the chamber. The slot may be in communication with the chamber at a top of the chamber.

The antenna apparatus can also include sidewalls, such as a first sidewall and a second sidewall. The sidewalls may be uniform metal structures, elongated members that extend along a substantial portion or entirety of an edge of the ground plane, or may be structure as a fence like structure that may have a plurality of gaps defined between spaced apart vias. For instance, in some embodiments the first sidewall can be comprised of a plurality of spaced apart vias extending between the first edge of the ground plane and the first outer edge of the first patch and the second sidewall is comprised of a plurality of spaced apart vias extending between the second edge of the ground plane and the first outer edge of the second patch. In other embodiments, the first sidewall may define a continuous wall that extends along an entirety of the first edge of the ground plane without any holes or apertures defined therein between the ground plane and the first outer edge of the first patch and the second sidewall may define a continuous wall that extends along an entirety of the second edge of the ground plane without any holes or apertures defined therein between the ground plane and the first outer edge of the second patch. In yet other embodiments, the first sidewall can extend from adjacent a first edge of the ground plane to adjacent a first outer edge of the first patch and the second sidewall can extend from adjacent a second edge of the ground plane to adjacent a first outer edge of the second patch. It should be understood that the first edge of the ground plane may be opposite the second edge of the ground plane The slot can be defined by a gap between a second inner edge of the first patch and a second inner edge of the second patch. The second inner edge of the first patch can be opposite the first outer edge of the first patch and the second inner edge of the second patch can be opposite the first outer edge of the second patch. The first outer edge of the second patch may be connected to the second sidewall and the first outer edge of the first patch can be connected to the second sidewall. The gap may have a uniform distance throughout the length of the slot such that the slot has a rectangular type shape which may have open ends that are in communication with the chamber and/or air surrounding the slot at the ends of the slot.

In some embodiments, the first sidewall can be comprised of a conductive material member, the second sidewall can be comprised of a conductive material member, and the ground plane can be comprised of a conductive material member. The first patch can be comprised of a conductive material member and the second patch can be comprised of a conductive material member. A dielectric material may be connected between the first path, second path, first and second sidewalls, and the ground plane. In some embodiments, the first patch and the second patch are a top of the antenna apparatus and the first sidewall extends along a portion of the first edge of the ground plane that is less than an entirety of the first edge of the ground plane and the second sidewall extends along a portion of the second edge of the ground plane that is less than an entirety of the second edge of the ground plane.

The first patch can have a first side extending between the first outer edge of the first patch and the second inner edge of the first patch and the first patch can also have a second side extending between the first outer edge of the first patch and the second inner edge of the first patch. The first side of the first patch can be opposite the second side of the first patch. The second patch can also have a first side extending between the first outer edge of the second patch and the second inner edge of the second patch and a second side extending between the first outer edge of the second patch and the second inner edge of the second patch. The first side of the second patch can be opposite the second side of the second patch. The first side of the first patch can define a cutout region, the second side of the first patch can define a cutout region, the first side of the second patch can define a cutout region and the second side of the second patch can define a cutout region. The cutout regions may define a polygonal shaped opening or recess. For instance, each cutout region can be defined such that the cutout region has a generally U shaped opening, a generally V shaped opening, a generally rectangular shaped opening, or a curved shaped opening may (e.g. a "C" shaped opening).

The slot defined between the first and second patches can be at a center of a top of the antenna apparatus. In some embodiments, the slot may have a uniform width, length, and thickness. In other embodiments, the width or length of the slot may vary at different sections of the slot. A radio frequency identification chip can be positioned in a center of the slot between a middle portion of the second inner edge of the first patch and a middle portion of the second inner edge of the second patch. In other embodiments, a different type of chip can be positioned in the slot. That chip may be positioned in a central portion of the slot or at another location within the slot.

A communication system is also provided. The communication system can include a computer device having non-transitory memory and a processor connected to the memory, a reader device communicatively connected to the computer device, and an identification device having an embodiment of our antenna apparatus.

A radio frequency identification (RFID) device is also provided. The RFID device can include an embodiment of our antenna apparatus.

In some embodiments of the RFID device, the first and second patches, the first and second sidewalls, and the ground plane can define a chamber therebetween. A dielectric substrate can be positioned in the chamber between the first and second patches, first and second sidewalls, and the ground plane.

In some embodiments, the RFID device can be configured so that the first patch has a first side extending between the first outer perimeter edge of the first patch and the second inner edge of the first patch and the first patch has a second side extending between the first outer perimeter edge of the first patch and the second inner edge of the first patch where the first side of the first patch is opposite the second side of the first patch. The second patch can also have a first side extending between the first outer perimeter edge of the second patch and the second inner edge of the second patch and a second side extending between the first outer perimeter edge of the second patch and the second inner edge of the second patch where the first side of the second patch being opposite the second side of the second patch. The first side of the first patch can have a cutout region, the second side of the first patch can have a cutout region, the first side of the second patch can have a cutout region and the second side of the second patch can have a cutout region. The slot can be at a center of a top of the antenna apparatus and the radio frequency identification chip can be at a center of the slot (e.g. in the slot between the middle or center of the inner second side of the first path and the middle or center of the inner second side of the second patch).

Other details, objects, and advantages of the invention will become apparent as the following description of certain exemplary embodiments thereof and certain exemplary methods of practicing the same proceeds.

BRIEF DESCRIPTION OF THE DRAWINGS

Exemplary embodiments of an RFID antenna apparatus, exemplary embodiments of communication systems utilizing such RFID antenna apparatus, and embodiments of RFID tags utilizing such RFID antenna apparatuses are shown in the accompanying drawings and certain exemplary methods of making and practicing the same are also illustrated therein. It should be appreciated that like reference numbers used in the drawings may identify like components.

DETAILED DESCRIPTION OF EXEMPLARY EMBODIMENTS

Figure 1:
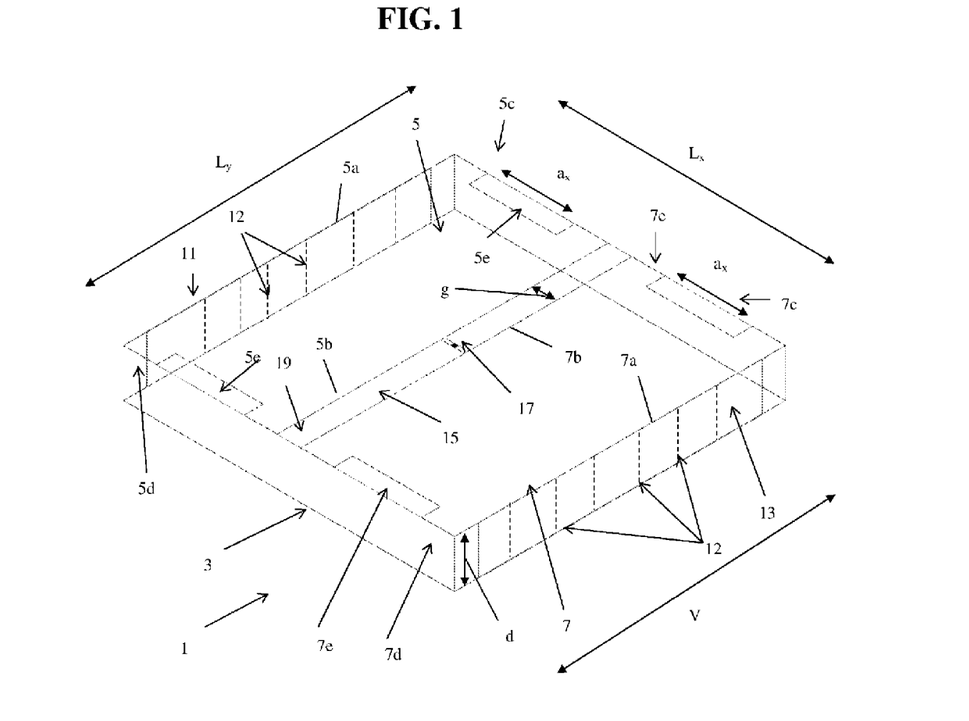
FIG. 1 is a perspective view of a first exemplary embodiment of an RFID device having a first exemplary embodiment of an RFID antenna apparatus.
Figure 9:
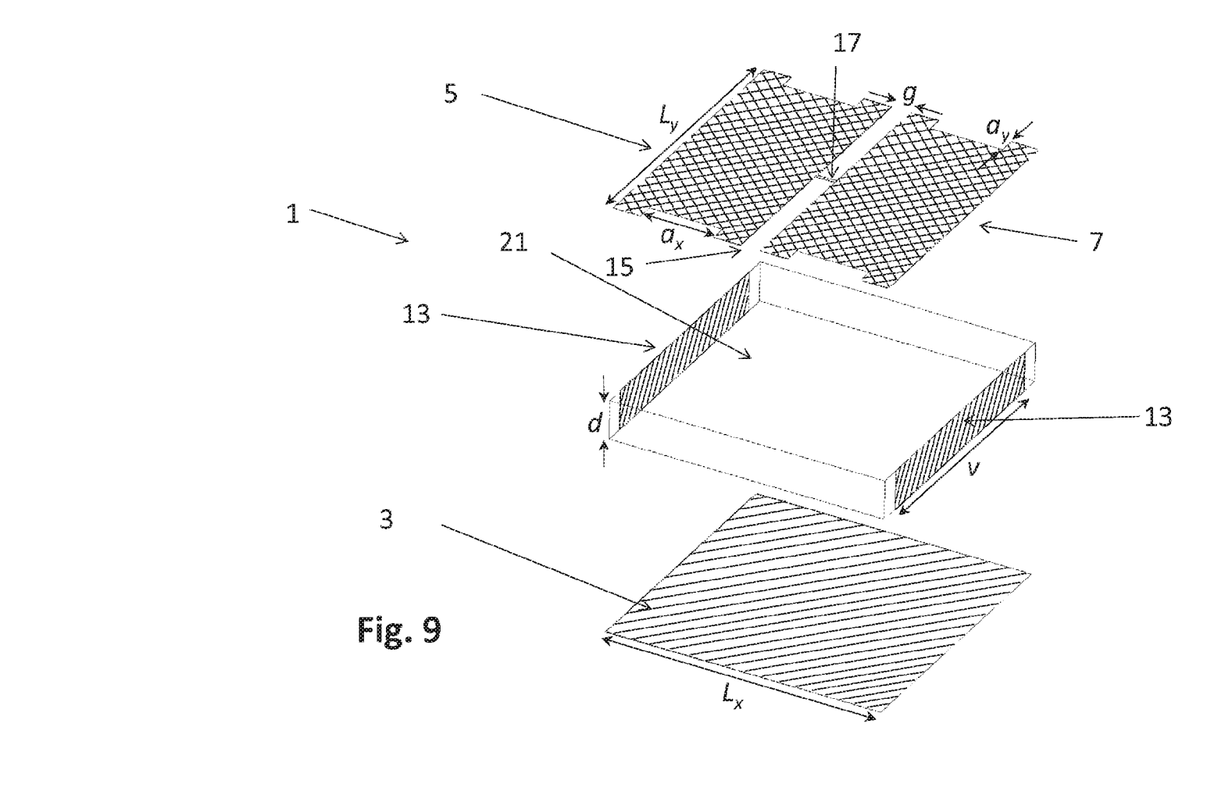
FIG. 9 is an exploded view of the first exemplary embodiment of the RFID device having a first exemplary embodiment of an RFID antenna apparatus.

Referring to FIGS. 1 and 9, an antenna apparatus 1 can include a ground plane 3, a first patch 5, and a second patch 7. A first sidewall 11 may extend from adjacent a first edge of the ground plane 3 to adjacent a first outer perimeter edge 5a of the first patch 5. A second sidewall 13 may extend from adjacent a second edge of the ground plane 3 to adjacent a first outer perimeter edge 7a of the second patch 7. In some embodiments, the first and second edges of the ground plane 3 from which the first and second sidewalls 11 and 13 extend may be on opposite sides of the ground plane 3. The first and second sidewalls 11 and 13 may each be unitary wall structures composed of an electrically conductive material (e.g. metal, graphene, a conductive polymeric material, etc.) that extend linearly from the ground plane 3 to the patch to which they extend to and are attached to.

In other embodiments, the first sidewall 11 and second sidewall 13 can each be a plurality of vias 12 that are spaced apart from each other and extend between the ground plane 3 and the patch to which that sidewall is attached, as shown in broken line in FIG. 1. Such an alternative sidewall may have gaps or holes defined between immediately adjacent spaced apart vias.

The first patch 5 may have a second inner edge 5b that is on a side of the first patch 5 that is opposite the side having the first outer perimeter edge 5a. The second patch 7 may also have a second inner edge 7b that is on a side of the second patch 7 that is opposite the side having the first outer perimeter edge 7a. The second inner edges 5b and 7b of the first and second patches 5 and 7 may be spaced apart from each other by a gap to define an elongated gap or other type of slot 15 between the first and second patches 5 and 7 that is also spaced apart from the ground plane 3. The second inner edges 5b and 7b of the first and second patches 5 and 7 may each be linearly extending edges. The second inner edge 5a of the first patch may be spaced apart from the second inner edge of the second patch 7 by a distance g and be uniformly spaced by distance g along the entirety of the slot 15 that extends between the second inner edges 5b and 7b. In some embodiments, distance g may be between 1% and 12% of the length $L_x$ of the ground plane 3, between 3% and 10% of the length $L_x$ of the ground plane 3, or between 5% and 8% of the length $L_x$ of the ground plane 3.

The first and second patches 5 and 7 may also be spaced apart from the ground plane 3 via the first and second sidewalls 11 and 13 to define a chamber 19 that is between the first and second patches 5 and 7 and the ground plane 3. The depth of the chamber 19 may be defined by the space between the inner faces of the first and second patches 5 and 7 and the inner face of the ground plane 3. A substrate 21 composed of dielectric material can be positioned in the chamber 19. The first and second patches 5 and 7, the first and second sidewalls 11 and 13, and the ground plane can all be positioned on a surface of the substrate positioned in the chamber 19 such that all of these conductive elements reside on a surface of the substrate. For example, inner faces of the ground plane 3, first and second sidewalls 11 and 13, first patch 5, and second patch 7 can each define the chamber 19 and be positioned on and/or in contact with a surface of a dielectric substrate positioned in the chamber 19.

The depth d of the antenna apparatus can be defined by the depth of the chamber 19 and thickness of the first and second patches 5 and 7 and thickness of the ground plane 3. The depth d of the antenna apparatus may be a linear distance extending between an exterior face of the first patch 5 or second patch 7 and the exterior face of the ground plane 3. The depth d may be perpendicular to the length $L_x$ and width $L_y$ of the ground plane 3, which may also define the length and width of the antenna apparatus 1.

A chip 17, such as an RFID chip, can be attached to at least one of the first patch 5, second patch 7, and ground plane 3 so that the chip 17 is positioned in the slot 15. The chip 17 can be positioned in the center of the slot 15 between the inner edges 5b, 7b of the first and second patches 5 and 7. For instance, the chip 17 can be in the slot 17 between a center portion, or middle portion of the inner edge 5b of the first patch and the center portion or middle portion of the inner edge 7b of the second patch. At least a portion of the chip 17 and/or a connector element that extends from the chip 17 to connect the chip 17 to the first patch 5, second patch 7, and/or ground plane 3, may also be in the chamber 19 when positioned in the slot 15. For example, in some embodiments, the chip 17 may be positioned in the slot 17 and be electrically connected to the first patch 5 and the second patch 7. The chip 17 may also be positioned on or otherwise connected to the substrate located in the chamber 19.

The ground plane 3 can be a conductive material member such as, for example, a metallic member that is generally planar or flat in shape, a conductive polymeric material member that is generally planar, or a member composed of graphene that is generally planer in shape or flat in shape. For instance, the ground plane 3 may be a metallic rectangular shaped plate or a conductive polymeric material member rectangular shaped plate. The ground plane 3 could be structured as a member having another type of shape or structure. For instance, in other embodiments, the ground plane may be a polygonal shaped plate composed of an electrically conductive material or a circular shaped plate composed of an electrically conductive material.

The first and second patches 5 and 7 may also be members that are generally planar or flat in shape that are composed of an electrically conductive material (e.g. metal, graphene, a conductive polymeric material, etc.). For instance, the first and second patches 5 and 7 may each be generally rectangular shaped metallic members or be generally polygonal shaped metallic structures. In other embodiments, the first and second patches 5 and 7 could be circular or oblong shaped members composed of electrically conductive material.

In some embodiments, the ground plane 3 can have a length $L_x$ and a width $L_y$. The width $L_y$ can extend from the first edge of the ground plane 3 to which the first sidewall 11 can be attached to the second edge of the ground plane 3 to which the second sidewall 13 can be attached. The length $L_x$ can extend linearly along the first edge. The length $L_x$ can be uniform throughout the width $L_y$ of the ground plane 3 so that the first and second edges may each have the same length $L_x$. The width $L_y$ of the ground plane 3 may also be uniform so that the width $L_y$ is the same throughout the entire length $L_x$ of the ground plane 3.

The first and second sidewalls 11 and 13 can each extend along the width $L_y$ of a respective edge of the ground plane 3. The first and second sidewalls 11 and 13 may each extend over less than the full width $L_y$. For instance, the first sidewall 11 may extend along a portion v of the width $L_y$ of the first edge of the ground plane and the second sidewall 13 may extend along a portion v of the width $L_y$ of the second edge of the ground plane. Portion v of width $L_y$ may be 6/7 of the full width $L_y$ of the edges of the ground plane 3. In other embodiments, portion v may be a distance that is between 50% and 95% of the full width $L_y$ or may be between 80% and 90% of the full width $L_y$ of the ground plane. In embodiments of the sidewalls in which the sidewalls are defined by a plurality of spaced apart vias 12, the vias 12 may be aligned next to each other so that the terminal ends of each sidewall defined by the spaced apart vias 12 are spaced apart from each other by a distance that is equal to a portion v of the width $L_y$ of the ground plane 3 (e.g. is a distance that may be between 50% and 95% of the full width Ly, or between 80% and 90% of the full width $L_y$, etc.).

The first and second patches 5 and 7 can also have first sides 5c, 7c and second sides 5d, 7d that extend between the inner edges 5b, 7b and outer perimeter edges 5a, 7a of the patches. The first sides 5c, 7c of the first and second patches 5 and 7 are opposite the second sides 5d, 7d of the first and second patches 5 and 7. The first side 5c and second side 5d of the first patch 5 may each have a channel, slot, or other type of recess defined therein that extends linearly along a middle portion of those sides to define a cutout region 5e in the middle region of the first and second sides 5c and 5d. The cutout regions 5e formed in the first and second sides 5c and 5d may be rectangular shaped recess cutouts having a length $a_x$ and a width $a_y$. In some other embodiments, the cutout regions 5e of the first patch 5 may have different shapes (e.g. other polygonal shape, etc.).

The second patch 7 may also include cutout regions 7e in corresponding locations to the cutout regions 5e in the first and second sides 5c and 5d of the first patch 5 in the first and second sides 7c and 7d of the second patch 7. For instance, the first side 7c and second side 7d of the second patch 7 may each have a channel, slot, or other type of recess defined therein that extends linearly along a middle portion of those sides to define a cutout region 7e in the middle region of the first and second sides 7c and 7d. Each of the cutout regions 7e formed in the first and second sides 7c and 7d of the second patch 7 may be a rectangular shaped recess having a length $a_x$ and a width $a_y$. In some other embodiments, the cutout regions 7e of the second patch 7 may have different shapes (e.g. other polygonal shapes, etc.).

In some embodiments, lengths $a_x$ of the cutout regions 5e and 7e of the first and second patches 5 and 7 may be between 10% and 45% of the length $L_x$ of the ground plane 3, between 20% and 30% of the length $L_x$ of the ground plane 3, or between 23% and 28% of the length $L_x$ of the ground plane 3. The width $a_y$ of the cutout regions 5e and 7e of the first and second patches 5 and 7 may be between 1% and 10% of the width $L_y$ of the ground plane 3, between 3% and 8% of the width $L_y$ of the ground plane 3, or between 5% and 6% of the width $L_y$ of the ground plane 3 in some embodiments. In other embodiments, the length and width $a_x$ and $a_y$ of these cutout regions 5e and 7e of the first and second patches 5 and 7 could be other dimensions outside of such ranges.

In some embodiments, the first and second patches 5 and 7 and slot 15 can be the top of the antenna apparatus and the ground plane 3 can be the bottom of the antenna apparatus. The top slot 15 may be configured as a radiating slot that is at a center of the top layer of the antenna apparatus 1 defined by the first and second patches 5 and 7. The first and second sidewalls 11 and 13 may define exterior sides of the antenna apparatus 1 and the chamber 19 may be within the antenna apparatus between its top, bottom, and exterior sides.

The size of the slot 15 and the distance g between the second inner edges 5b and 7b of the first and second patches 5 and 7 can provide for, define, or help define, the capacitance of the antenna apparatus. The capacitance (also referred to as "C"), when combined together with the inductance (also referred to as "L") that can be provided by the connected metal components of the antenna apparatus, which includes the first and second patches 5 and 7, the first and second sidewalls 11 and 13, and the ground plane 3, can form a LC resonating circuit. For such embodiments, the radiating slot 15 located between the first and second patches 5 and 7 at the top layer can provide radiation resistance (which can also be referred to as "$R_{rad}$"). For such embodiments, it is contemplated that the shape of the top layer can be any of a number of different shapes and that the first and second sidewalls 11 and 13 may be vertically extending metal sidewalls or may be defined by a plurality of spaced apart vias 12. For such embodiments, it should be understood that the capacitance and inductance of the entire structure of the antenna apparatus 1 may have to be tuned to account for different geometries and other variables for providing a desired antenna functionality that can meet a particular set of design criteria (e.g. lengths, widths, depths, and size of slot 15, first and second patches 5 and 7 and ground plane 3 may be varied and the dimension of chamber 19 can be varied, etc.).

An RFID chip 17 may be placed in the gap between the second inner edges 5b and 7b of the first and second patches 5 and 7 and attached to at least one of the first patch 5, second patch 7, and ground plane 3. For some embodiments, the input impedance of the antenna apparatus can be in the 900-928 Mega Hertz (MHz) U.S. RFID band. In other embodiments, a different range of input impedance can be utilized.

Figure 2:
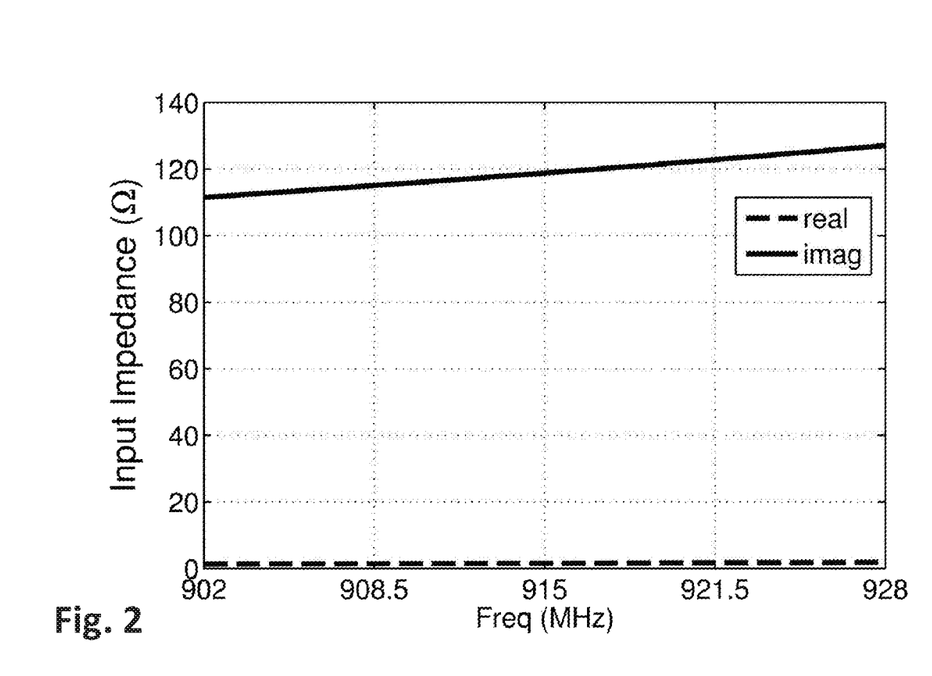
FIG. 2 is a graph illustrating input impedance (real and imaginary parts) that was determined for an exemplary embodiment of the antenna apparatus in free space.
Figure 3:
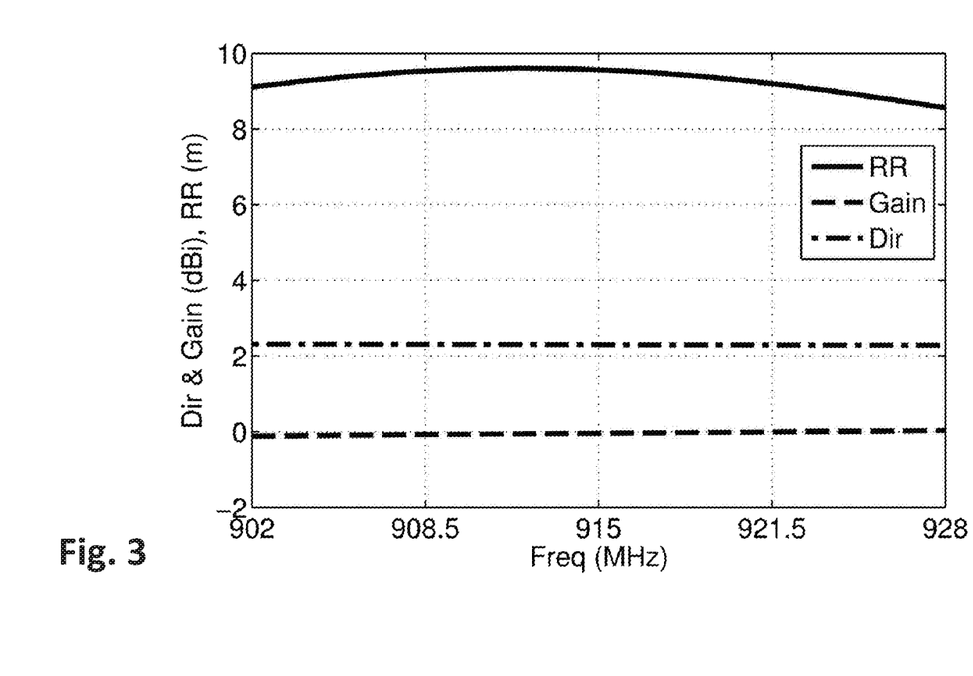
FIG. 3 is a graph illustrating directivity, gain, and the read range that was determined for an exemplary embodiment of the antenna apparatus in free space.

FIGS. 2 and 3 illustrate input impedance (real ("real") and imaginary ("imag") parts), directivity ("Dir"), gain ("Gain"), and read rang ("RR") of an exemplary embodiment of an antenna apparatus 1 in free space that had a particular shape and geometry in which ground plane 3 has a length $L_x$ of 35 millimeters (mm), and a width $L_y$ is 35 mm, cutout regions 5e and 7e had cutout region length $a_x$ of 9.25 mm, and cutout region widths $a_y$ of 2 mm. This embodiment of the antenna apparatus 1 had a depth d of 5 mm, and the distance of portion v along which the first and second sidewalls 11 and 13 extend was 30 mm. Distance g for the slot 15 was 2.5 mm. For this particular embodiment, a substrate to which the ground plane 3 was attached was Arlon 100, which had an $\in_r$ of 10 and a $\delta_{tan}$ of 0.0025 (other embodiments can utilize other types of substrate materials, including, for example, rigid substrate members, flexible substrate members, or other types of substrates). As can be seen from FIGS. 2 and 3, the RFID device having the antenna apparatus embodiment was determined to have an input impedance in the 900-928 MHz U.S. RFID band, had a small resistance of around 1.6 Ohms and an inductive reactance of about j118.8 Ohms, which cancelled out the capacitive reactance of the RFID chip 17. This embodiment of the antenna apparatus 1 was determined to have a gain of around 0 decibels relative to isotropic ("dBi") throughout the 900-928 MHz US RFID band with a maximum read range of 7.6 meters (m).

Figure 5:
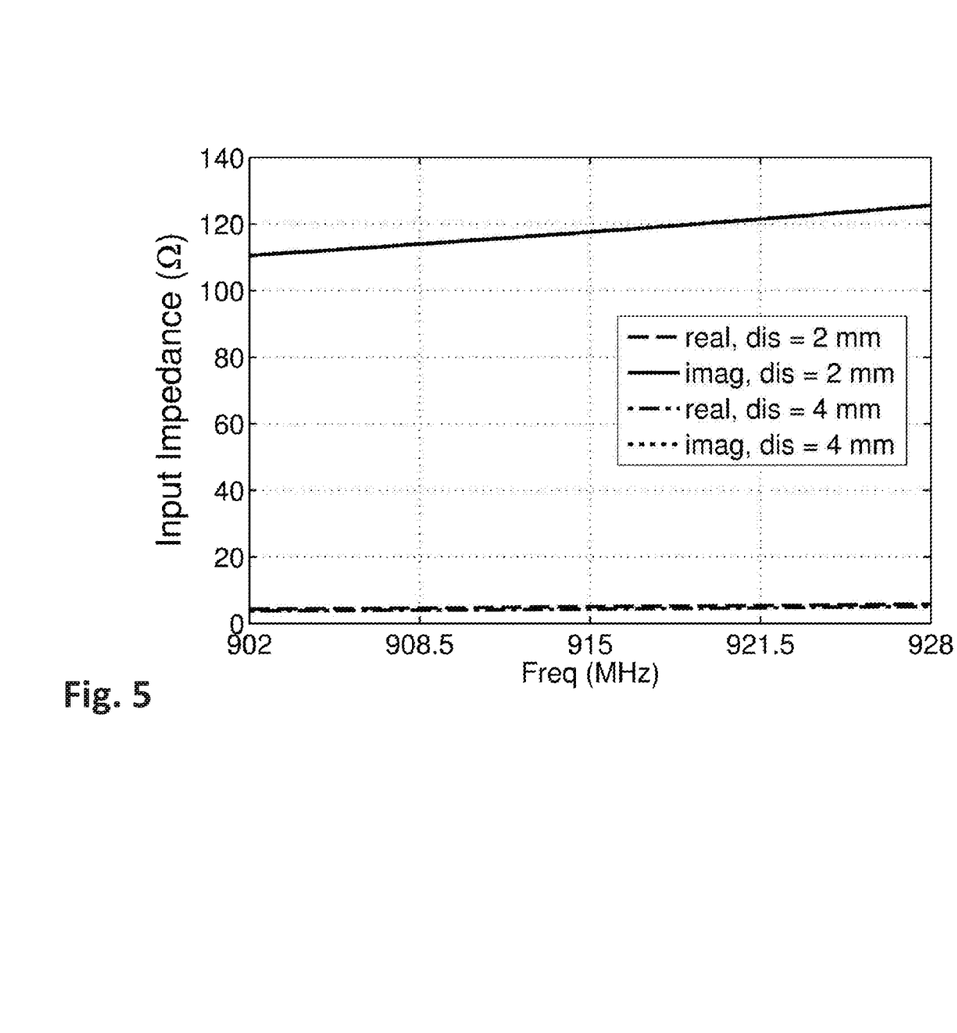
FIG. 5 is a graph illustrating input impedance (real and imaginary parts) that was determined for an exemplary embodiment of the antenna apparatus when on an animal body.
Figure 6:
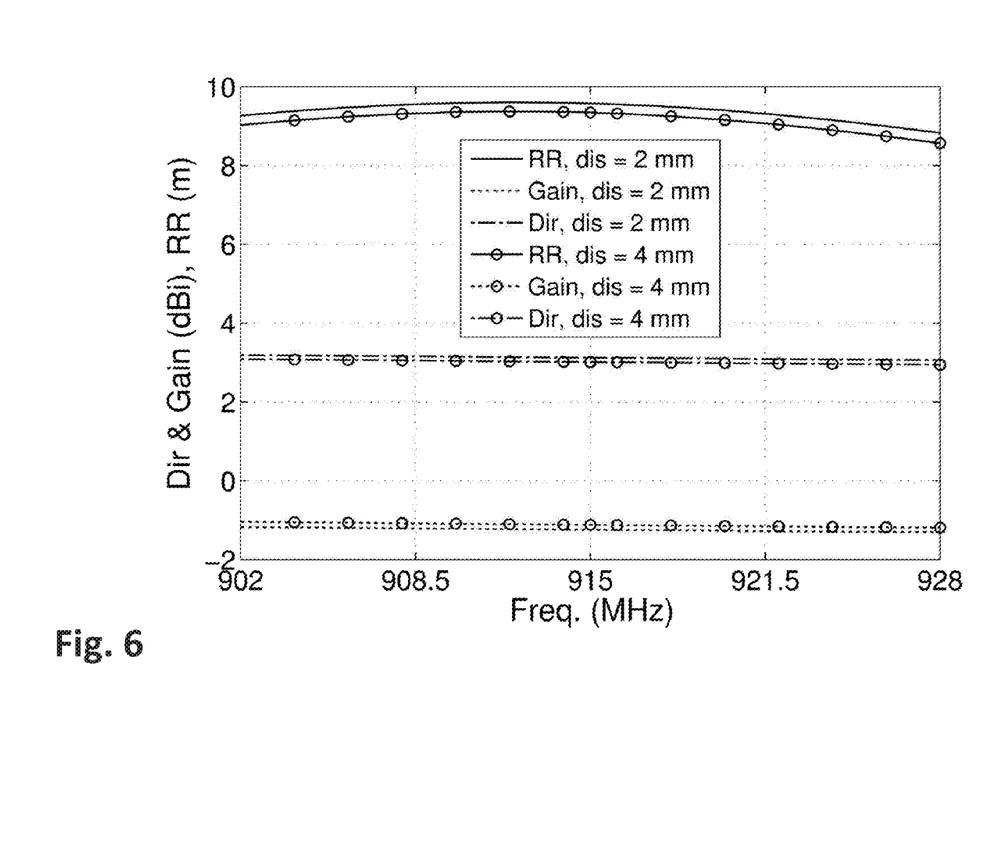
FIG. 6 is a graph illustrating directivity, gain, and the read range that was determined for an exemplary embodiment of the antenna apparatus when on an animal body.

FIG. 5 illustrate the input impedance (real and imaginary parts) that was determined for this particular embodiment of the antenna apparatus when on a human arm having layers of bone, muscle, fat, and skin, when the antenna apparatus was positioned to be 2 mm and 4 mm above a human body. The real impedance results in FIG. 5 are identified in the key as "real, dis=2 mm" for the 2 mm distance results and "real, dis=4 mm" for the 4 mm distance results and the imaginary parts of the determined impedance at the 2 mm and 4 mm distances are labeled in the key of FIG. 5 as "imag, dis=2 mm" for the 2 mm distance results and "imag, dis—4 mm" for the 4 mm distance results. FIG. 6 illustrates the directivity ("Dir."), gain ("Gain"), and read range ("RR") that was determined for this particular embodiment of the antenna apparatus 1 when worn on a human body. As can be seen from FIGS. 5 and 6, the input impedance of this embodiment of the antenna apparatus when worn by a human body was determined to have a real part of around 4.4 Ohms and an imaginary part of j117.5 Ohms where the distance between the antenna apparatus and the human arm was 4 mm. When this distance was reduced to 2 mm, a resistance of 5 Ohms and a reactance of j117.5 Ohms were determined for this embodiment of the antenna apparatus.

In contrast to the negative impacts of the human body on the performance of conventional RFID tag antennas, the human body was determined to not significantly affect the reactance of this embodiment of the antenna apparatus. But, the human body was determined to increase the resistance, which was believed to be helpful for improving the read range of this embodiment of the antenna apparatus. For instance, as shown in FIG. 6, the gain of this embodiment of the antenna apparatus was determined to be around −1 dBi, which is slightly smaller than that of this antenna apparatus in free space. Such a value is much larger than that of other wearable RFID tag antennas that exist. Further, this particular embodiment of the antenna apparatus also provided a much smaller footprint as compared to conventional RFID tag antennas. In fact, it is contemplated that other embodiments of our antenna apparatus 1 may be configured to provide a small footprint and still provide a read range of around 9.5 meters even when worn on a human body.

It is also contemplated that embodiments of our antenna apparatus 1 can be configured to match to a 50 Ohm load using a matching network. Such a configuration would allow the antenna apparatus to operate in both an energy harvesting mode and in a communication mode.

Figure 4:
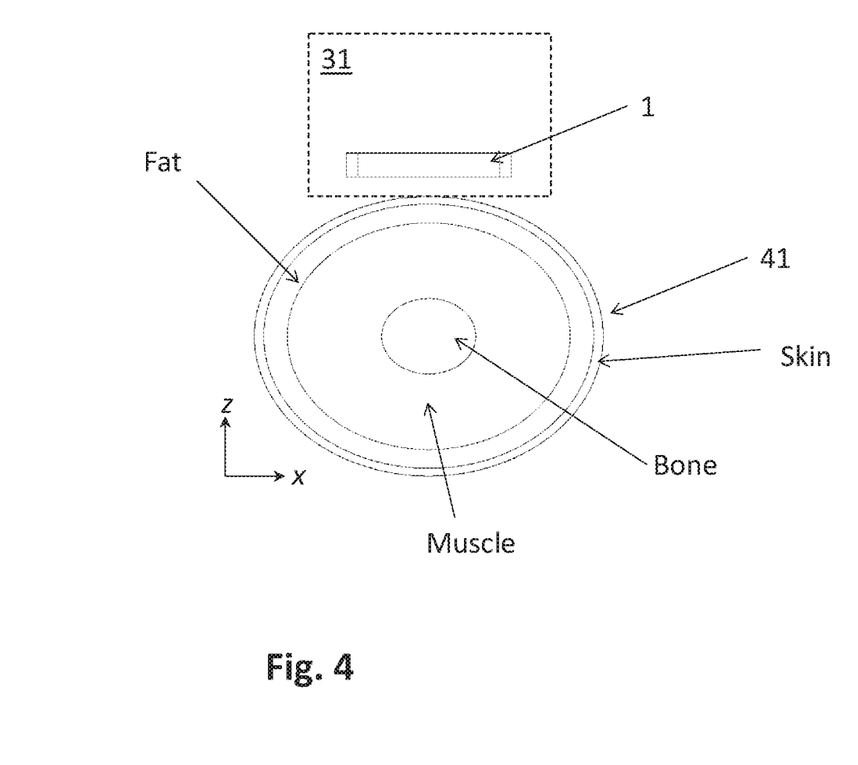
FIG. 4 is a cross-sectional view illustrating z and x axes components of the first exemplary embodiment of an RFID device having the first exemplary embodiment of the RFID antenna apparatus being attached to or otherwise mounted on a body part of an animal.
Figure 8:
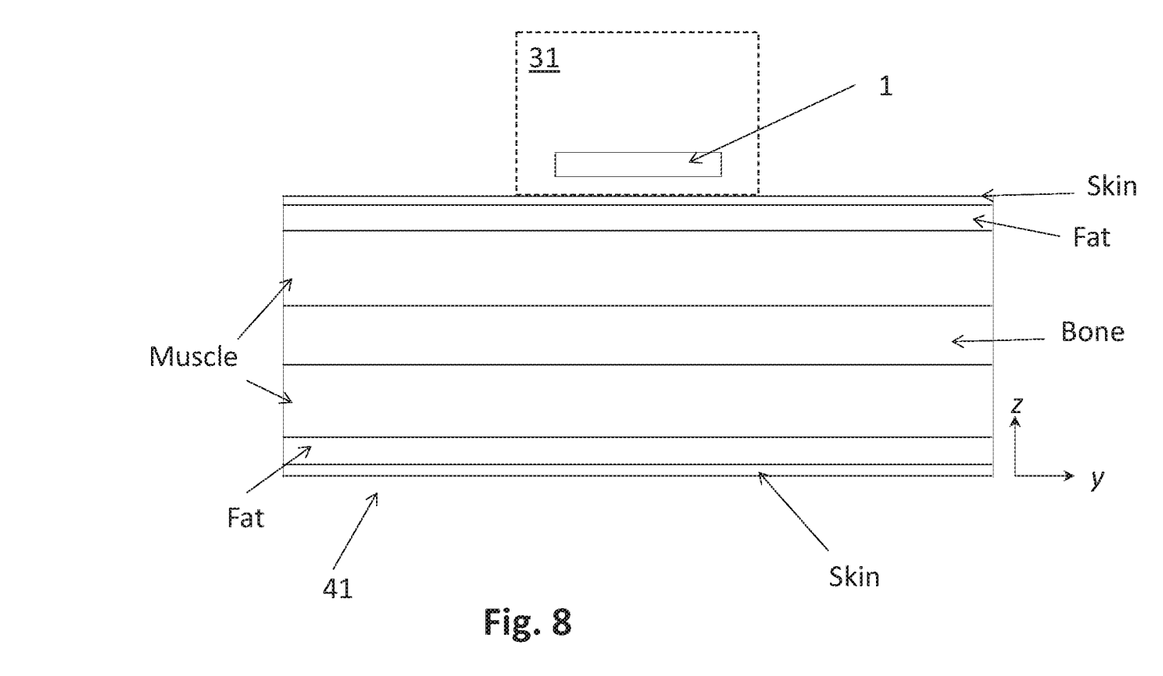
FIG. 8 is a cross-sectional view illustrating z and y axes components of the first exemplary embodiment of the RFID device having the first exemplary embodiment of the RFID antenna apparatus being attached to or otherwise mounted on a body part of an animal.

Referring to FIGS. 4 and 8, embodiments of the antenna apparatus 1 can be attached to a wearable body 31, which is shown in broken line in FIG. 4. The wearable body 31 can be attached to the antenna apparatus 1 and be configured to position the antenna apparatus 1 a certain distance (e.g. a pre-selected distance or a predetermined distance) above a portion of the body 41 to which the antenna apparatus 1 is to be attached. In some embodiments, the wearable body 31 may be a band, bracelet, a badge, a ring, a wrist band, a head band, a clip-on badge, or other type of wearable element or garment.

Figure 7:
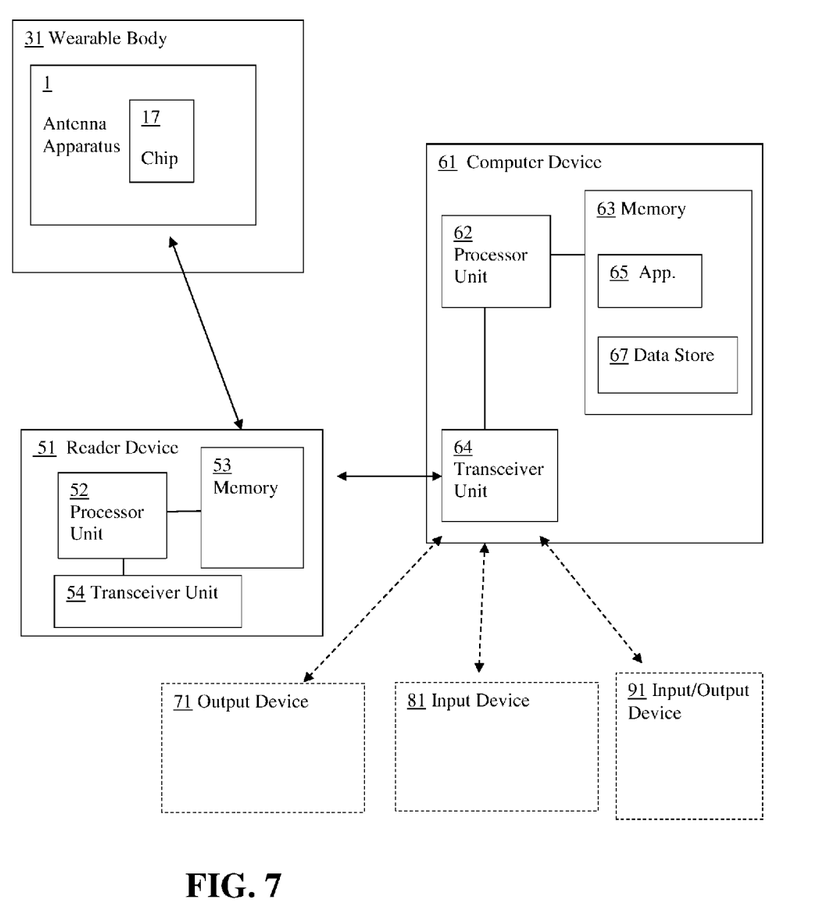
FIG. 7 is a block diagram of an exemplary embodiment of a communication system that includes the first exemplary embodiment of an RFID device.

Referring to FIG. 7, embodiments of the antenna apparatus may be included in communication systems that include a reader device 51 and at least one computer device 61. The reader device 51 may be configured as an RFID reader that has a processor unit 52 that is connected to a non-transitory memory 53 and at least one transceiver unit 54, which may include at least one receiver and at least one transmitter. The processor unit 52 may be a microprocessor, central processing unit, or other type of hardware processor device and the memory 53 may be flash memory or other type of memory.

The computer device 61 may include hardware. The hardware can include a processor unit 62 that is connected to non-transitory memory 63 and at least one transceiver unit 64, which may include at least one receiver and at least one transmitter. The processor unit 62 may be a microprocessor, a central processing unit, or other type of hardware processor device. The memory 63 may be flash memory, a hard drive, or other type of non-transitory memory or memory storage device. The memory 63 can have at least one application ("App.") 65 and at least one data store 67 stored thereon. Each data store 67 may be, for example, a database, a file, or other type of data store. The application may include code that defines a method that is performed by the computer device 61 when the processor unit 62 runs the application 65. The computer device 61 may also be communicatively connected to at least one output device 71, at least one input device 81 and/or at least one input/output device 91 (shown in broken line in FIG. 7). Examples of an input device 81 include, for example, a pointer, a keyboard, a button, a stylus or a touch screen display. Examples of an output device include, for example, a printer and a display device such as a monitor, television, display, or liquid crystal display. Examples of an input/output device include, for example, a touch screen display. These devices may be connected to the computer device 61 via a wired communication connection and/or a wireless communication connection (e.g. Bluetooth or wireless local area network connection). In some embodiments, the communication system can be part of a large area network, local area network, or wide area network in which other network nodes are included for facilitating communication connections between different devices (e.g. base stations, access points, internet of things, etc.).

The communication system can be configured so that the reader device 51 can emit a radio signal to detect the presence of any RFID device that may have an antenna apparatus 1. The antenna apparatus 1 may responds to the signal emitted by the RFID device so that the reader device 1 is able to detect the antenna apparatus 1. For embodiments of the antenna apparatus 1 that are also configured for energy harvesting, the antenna apparatus 1 may also be configured so that the received signals are able to power or charge a powering element of the chip 17 and/or antenna apparatus 1 (e.g. a battery, microprocessor, etc.).

The reader device 51 may receive a signal from the antenna apparatus 1 that is transmitted via the chip 17 to respond to the reader device's output signal. The reader device 51 may interpret that response to indicate it has detected an RFID device and communicate information relating to the detection of the antenna apparatus and/or chip 17 connected to that antenna apparatus 1 to the computer device 61.

The computer device 61 may receive such information from the reader device 51 and store such information in a data store 67 in its memory 63 for use in tracking a location of the chip 17 and/or antenna apparatus 1. The reader device 51 may include information about the location of the reader device 51 in such communication to the computer device 61 or the computer device 61 may be configured to correlate the location of the detected RFID device having the antenna apparatus 1 with the location assigned to that reader device 51 providing the information about the detection via a database or other data store 67. The computer device 61 and reader device 51 may be communicatively connected to each other for performing such communications via a wired connection or via a wireless connection such as a network connection (e.g. a Wi-Fi connection, a wide area network connection, a cellular network connection, or other type of wireless connection such as, for example, a Bluetooth connection).

When a human or other animal is wearing the RFID device having the antenna apparatus 1, the human or other animal may then be tracked based on which RFID readers within an array of spaced apart RFID readers may detect the presence of the RFID device. For instance, RFID readers spaced throughout a building or other geographical location (e.g. a building complex, a hospital, a nursing home, a prison, a city, a country, etc.) may all be configured to communicatively connect to a central computer device (e.g. a server computer device) to communicate with that central computer device for updating that device as to the presence of a detected RFID device that is associated with a particular animal so that the location of that animal may be tracked. Time information associated with the detection of the RFID device having the antenna apparatus 1 and location information associated with the reader device 51 that detected that RFID device at a particular time may be included in such information that is tracked by the computer device 61 for tracking the location of the animal wearing the RFID device. The computer device 61 can also be configured to print out or display to another device graphical indicia identifying a location of the animal associated with the RFID device and/or a history of where that animal has traveled over a certain time period via a display device or another type of computer device connected to the computer device 61 (e.g. a smart phone connected to the computer device 61 and having a graphical user interface that generates the display of such information based on communications exchanged with the computer device 61).

It should be appreciated that embodiments of our antenna apparatus, RFID devices utilizing such an antenna apparatus, and embodiments of communication systems utilizing one or more such antenna apparatus may be altered to meet a particular set of design criteria. For instance the size, shape and material composition of sidewalls, the ground plane 3, first patch 5, and second patch 7 can be adjusted as needed to meet a particular design objective. As yet another example, the substrate to which the antenna apparatus may be attached can be any suitable substrate material. As yet another example, the wearable body 31 can be any type of wearable structure. As yet another example, the computer device 61 may be any type of computer device including for example, a server, a personal computer, work station, a laptop, an electronic tablet, a smart phone, or other type of computer device. Therefore, while certain exemplary embodiments of RFID antenna apparatus, exemplary embodiments of communication system arrangements utilizing such RFID antenna apparatus, and embodiments of RFID tags utilizing such RFID antenna apparatuses, and methods of making and using the same have been discussed and illustrated herein, it is to be distinctly understood that the invention is not limited thereto but may be otherwise variously embodied and practiced within the scope of the following claims.

What is claimed is:

1. An antenna apparatus comprising:
   a ground plane having a first edge and a second edge, the first edge of the ground plane being opposite the second edge of the ground plane;
   a first patch spaced apart from the ground plane, the first patch having a first outer edge and a second inner edge that is opposite the first outer edge, a first side that extends from the first outer edge of the first patch to the second inner edge of the first patch, and a second side that extends from the first outer edge of the first patch to the second inner edge of the first patch, the first side of the first patch being opposite the second side of the first patch;
   a second patch spaced apart from the ground plane, the second patch having a first outer edge and a second inner edge that is opposite the first outer edge of the second patch, a first side that extends from the first outer edge of the second patch to the second inner edge of the second patch, and a second side that extends from the first outer edge of the second patch to the second inner edge of the second patch, the second side of the second patch being opposite the first side of the second patch;
   a first sidewall structure extending from the first edge of the ground plane to the first outer edge of the first patch;
   a second sidewall structure extending from the second edge of the ground plane to the first outer edge of the second patch,
   the first and second patches being spaced apart from each other to define a slot between the first and second patches that is spaced apart from the ground plane, the slot being defined by a gap between the second inner edge of the first patch and the second inner edge of the second patch, the gap defining a distance between the second inner edge of the first patch and the second inner edge of the second patch;
   the first side of the first patch having a first cutout region defined therein such that the first cutout region defines a first opening having a depth within a middle portion of the first side of the first patch that is between the first outer edge of the first patch and the second inner edge of the first patch and is spaced apart from the first outer edge of the first patch and is also spaced apart from the second inner edge of the first patch;
   the second side of the first patch having a second cutout region defined therein such that the second cutout region defines a second opening having a depth within a middle portion of the second side of the first patch that is between the first outer edge of the first patch and the second inner edge of the first patch and is spaced apart from the first outer edge of the first patch and is also spaced apart from the second inner edge of the first patch;
   the first side of the second patch having a third cutout region defined therein such that the third cutout region defines a third opening having a depth within a middle portion of the first side of the second patch that is between the first outer edge of the second patch and the second inner edge of the second patch and is spaced apart from the first outer edge of the second patch and is also spaced apart from the second inner edge of the second patch; and the second side of the second patch having a fourth cutout region defined therein such that the fourth cutout region defines a fourth opening having a depth within a middle portion of the second side of the second patch that is between the first outer edge of the second patch and the second inner edge of the second patch and is spaced apart from the first outer edge of the second patch and is also spaced apart from the second inner edge of the second patch.

2. The antenna apparatus of claim 1, wherein the first and second patches and the ground plane define a chamber therebetween, a dielectric substrate being positioned in the chamber.

3. The antenna apparatus of claim 1, wherein at least one of: the first sidewall structure is comprised of a plurality of vias and the second sidewall structure is comprised of a plurality of vias.

4. The antenna apparatus of claim 3, wherein the first sidewall structure is comprised of a plurality of vias and the second sidewall structure is comprised of a plurality of vias.

5. The antenna apparatus of claim 4, wherein the first sidewall structure extends along a portion of the first edge of the ground plane that is less than an entirety of the first edge of the ground plane and the second sidewall structure extends along a portion of the second edge of the ground plane that is less than an entirety of the second edge of the ground plane.

6. The antenna apparatus of claim 1, wherein the first sidewall structure is comprised of a plurality of spaced apart vias extending between the first edge of the ground plane and the first outer edge of the first patch and the second sidewall structure is comprised of a plurality of spaced apart vias extending between the second edge of the ground plane and the first outer edge of the second patch.

7. The antenna apparatus of claim 1, wherein the first sidewall structure is comprised of a first conductive material member, the second sidewall structure is comprised of a second conductive material member, the ground plane is comprised of a third conductive material member, the first patch is comprised of a fourth conductive material member and the second patch is comprised of a fifth conductive material member.

8. The antenna apparatus of claim 1, wherein the first patch and the second patch are a top of the antenna apparatus.

9. The antenna apparatus of claim 1, wherein:
the first opening defined by the first cutout region has a first length that is less than a distance that the first side of the first patch extends from the first outer edge of the first patch to the second inner edge of the first patch;
the second opening defined by the second cutout region has a second length that is less than a distance that the second side of the first patch extends from the first outer edge of the first patch to the second inner edge of the first patch;
the third opening defined by the third cutout region has a third length that is less than a distance that the first side of the second patch extends from the first outer edge of the second patch to the second inner edge of the second patch; and
the fourth opening defined by the fourth cutout region has a fourth length that is less than a distance that the second side of the second patch extends from the first outer edge of the second patch to the second inner edge of the second patch.

10. The antenna apparatus of claim 9, wherein the first opening is a polygonally shaped recess, the second opening is a polygonally shaped recess, the third opening is a polygonally shaped recess and the fourth opening is a polygonally shaped recess.

11. The antenna apparatus of claim 10, wherein the slot is at a center of a top of the antenna apparatus.

12. The antenna apparatus of claim 10, comprising:
a radio frequency identification chip positioned in a center of the slot between a middle portion of the second inner edge of the first patch and a middle portion of the second inner edge of the second patch.

13. The antenna apparatus of claim 10, comprising:
a chip positioned in the slot, the slot being defined by the second inner edge of the first patch and the second inner edge of the second patch such that the slot extends linearly.

14. A communication system comprising:
a computer device having non-transitory memory and a processor connected to the memory;
a reader device communicatively connected to the computer device; and
an identification device having the antenna apparatus of claim 1.

15. A radio frequency identification (RFID) device, comprising:
an antenna apparatus comprising:
a ground plane having a first edge and a second edge, the first edge of the ground plane being opposite the second edge of the ground plane;
a first patch spaced apart from the ground plane, the first patch having a first outer edge and a second inner edge that is opposite the first outer edge, a first side that extends from the first outer edge of the first patch to the second inner edge of the first patch, and a second side that extends from the first outer edge of the first patch to the second inner edge of the first patch, the first side of the first patch being opposite the second side of the first patch;
a second patch spaced apart from the ground plane, the second patch having a first outer edge and a second inner edge that is opposite the first outer edge of the second patch, a first side that extends from the first outer edge of the second patch to the second inner edge of the second patch, and a second side that extends from the first outer edge of the second patch to the second inner edge of the second patch, the second side of the second patch being opposite the first side of the second patch;
a first sidewall structure extending from the first edge of the ground plane to the first outer edge of the first patch;
a second sidewall structure extending from the second edge of the ground plane to the first outer edge of the second patch;
the first and second patches being spaced apart from each other to define a slot between the first and second patches that is spaced apart from the ground plane, the slot being defined by a gap between the second inner edge of the first patch and the second inner edge of the second patch, the gap defining a distance between the second inner edge of the first patch and the second inner edge of the second patch;

the first side of the first patch having a first cutout region defined therein such that the first cutout region defines a first opening having a depth within a middle portion of the first side of the first patch that is between the first outer edge of the first patch and the second inner edge of the first patch and is spaced apart from the first outer edge of the first patch and is also spaced apart from the second inner edge of the first patch;

the second side of the first patch having a second cutout region defined therein such that the second cutout region defines a second opening having a depth within a middle portion of the second side of the first patch that is between the first outer edge of the first patch and the second inner edge of the first patch and is spaced apart from the first outer edge of the first patch and is also spaced apart from the second inner edge of the first patch;

the first side of the second patch having a third cutout region defined therein such that the third cutout region defines a third opening having a depth within a middle portion of the first side of the second patch that is between the first outer edge of the second patch and the second inner edge of the second patch and is spaced apart from the first outer edge of the second patch and is also spaced apart from the second inner edge of the second patch; and the second side of the second patch having a fourth cutout region defined therein such that the fourth cutout region defines a fourth opening having a depth within a middle portion of the second side of the second patch that is between the first outer edge of the second patch and the second inner edge of the second patch and is spaced apart from the first outer edge of the second patch and is also spaced apart from the second inner edge of the second patch; and a radio frequency identification chip positioned in the slot, the chip being electrically connected to the first patch and the chip being electrically connected to the second patch.

16. The RFID device of claim 15, wherein the slot is at a center of a top of the antenna apparatus and wherein the radio frequency identification chip is at a center of the slot.

17. The RFID device of claim 15, wherein:

the first opening defined by the first cutout region has a first length that is less than a distance that the first side of the first patch extends from the first outer edge of the first patch to the second inner edge of the first patch;

the second opening defined by the second cutout region has a second length that is less than a distance that the second side of the first patch extends from the first outer edge of the first patch to the second inner edge of the first patch;

the third opening defined by the third cutout region has a third length that is less than a distance that the first side of the second patch extends from the first outer edge of the second patch to the second inner edge of the second patch; and the fourth opening defined by the fourth cutout region has a fourth length that is less than a distance that the second side of the second patch extends from the first outer edge of the second patch to the second inner edge of the second patch.

18. The RFID device of claim 17, wherein the first opening defined by the first cutout region is a polygonally shaped recess, the second opening defined by the second cutout region is a polygonally shaped recess, the third opening defined by the third cutout region is a polygonally shaped recess and the fourth opening defined by the fourth cutout region is a polygonally shaped recess.

19. The RFID device of claim 15, wherein at least one of: the first sidewall structure is comprised of a plurality of spaced apart vias and the second sidewall structure is comprised of a plurality of spaced apart vias.

20. The RFID device of claim 15, wherein the first sidewall structure is comprised of a first conductive material member, the second sidewall structure is comprised of a second conductive material member, the ground plane is comprised of a third conductive material member, the first patch is comprised of a fourth conductive material member and the second patch is comprised of a fifth conductive material member; and wherein the slot is configured to provide radiation resistance and an input impedance of the antenna apparatus is within a range of 900-928 Mega Hertz (MHz).

\* \* \* \* \*